United States Patent
O'Callaghan et al.

(10) Patent No.: US 11,686,228 B2
(45) Date of Patent: Jun. 27, 2023

(54) MONITORING SYSTEM FOR PUMP WITH MECHANICAL SEAL LUBRICATION ARRANGEMENT

(71) Applicant: Cornell Pump Company, Clackamas, OR (US)

(72) Inventors: Colin O'Callaghan, Portland, OR (US); Luke Amstad, Oregon City, OR (US); William James Warren, Sandy, OR (US); Adam Lindeman, Portland, OR (US); Andrew Enterline, Troutdale, OR (US)

(73) Assignee: CORNELL PUMP COMPANY LLC, Wilmington, DE (US)

( * ) Notice: Subject to any disclaimer, the term of this patent is extended or adjusted under 35 U.S.C. 154(b) by 0 days.

(21) Appl. No.: 17/508,093

(22) Filed: Oct. 22, 2021

(65) Prior Publication Data

US 2022/0127982 A1  Apr. 28, 2022

Related U.S. Application Data

(60) Provisional application No. 63/104,800, filed on Oct. 23, 2020.

(51) Int. Cl.
*F01M 11/12* (2006.01)
*F01M 11/02* (2006.01)
(Continued)

(52) U.S. Cl.
CPC .............. *F01M 11/12* (2013.01); *F01M 11/02* (2013.01); *F01M 11/0458* (2013.01);
(Continued)

(58) Field of Classification Search
CPC .... F01M 11/12; F01M 11/02; F01M 11/0458; F01M 2011/021; F01M 2011/0466;
(Continued)

(56) References Cited

U.S. PATENT DOCUMENTS 5,746,435 A * 5/1998 Arbuckle ............. F16J 15/3484
277/304
9,869,430 B2 * 1/2018 Moon .................... F04B 49/065
(Continued)

FOREIGN PATENT DOCUMENTS

CN       106015028 B     5/2016
CN       207333701 U     5/2018
(Continued)

OTHER PUBLICATIONS

CN209310879—Machine translation (Year: 2019).*
(Continued)

*Primary Examiner* — Michael A Riegelman
(74) *Attorney, Agent, or Firm* — Snyder, Clark, Lesch & Chung, LLP

(57) ABSTRACT

Systems and methods are provided for remotely monitoring liquid lubricant levels for pump equipment. A system includes a reservoir to store lubricant and a lubrication gland to expose a shaft seal of the pump equipment to the lubricant. A feed line and a return line circulate the lubricant between the reservoir and the lubrication gland. A level sensor is configured to measure a fluid level in the reservoir. The level sensor uses a communication interface to transmit fluid level data a monitoring device mounted to the pump equipment. The monitoring device is configured to compare the fluid level data against stored alert thresholds and send, to a provider network, an alert signal when the fluid level data is below an alert threshold. If the fluid level data is not below an alert threshold, the monitoring device stores the fluid level data for periodic reporting.

20 Claims, 13 Drawing Sheets

(51) Int. Cl.
  *F01M 11/04* (2006.01)
  *F16N 19/00* (2006.01)
  *F16N 29/02* (2006.01)
(52) U.S. Cl.
  CPC .......... *F16N 19/006* (2013.01); *F16N 29/02* (2013.01); *F01M 2011/021* (2013.01); *F01M 2011/0466* (2013.01); *F16N 2210/16* (2013.01); *F16N 2250/18* (2013.01)
(58) Field of Classification Search
  CPC .... F16N 19/006; F16N 29/02; F16N 2210/16; F16N 2250/18; F16N 29/04; F16N 19/003; F16N 2260/16; F16N 2260/04; F16N 29/00
  See application file for complete search history.

(56) References Cited

U.S. PATENT DOCUMENTS

| | | | | |
|---|---|---|---|---|
| 10,408,489 | B1* | 9/2019 | Trishaun | F24F 13/222 |
| 10,545,120 | B2* | 1/2020 | Meek | G01N 29/4436 |
| 2013/0068562 | A1* | 3/2013 | Cornet | F16N 29/04 |
| | | | | 701/100 |
| 2014/0048461 | A1* | 2/2014 | Wrage | B63H 23/321 |
| | | | | 210/167.02 |
| 2014/0311240 | A1* | 10/2014 | Fitch | G01N 33/30 |
| | | | | 73/334 |
| 2017/0241955 | A1* | 8/2017 | Meek | G01N 29/326 |
| 2020/0232834 | A1* | 7/2020 | Liew | F01M 11/12 |
| 2020/0355543 | A1* | 11/2020 | Bregani | G01F 23/74 |
| 2020/0408219 | A1* | 12/2020 | Yoshikawa | F04D 7/02 |
| 2022/0127982 | A1* | 4/2022 | O'Callaghan | F04D 15/0218 |
| 2022/0228518 | A1* | 7/2022 | Hanna | B64D 47/02 |
| 2022/0268185 | A1* | 8/2022 | Dewhurst | F01M 11/0408 |

FOREIGN PATENT DOCUMENTS

| | | |
|---|---|---|
| CN | 108757502 A | 11/2018 |
| CN | 109404298 A | 3/2019 |
| CN | 109654038 A | 4/2019 |
| CN | 209310879 U | 8/2019 |
| DK | 201100793 A | 10/2011 |
| EP | 2573338 A1 | 3/2013 |
| EP | 2698315 A1 | 2/2014 |
| EP | 3420254 A1 | 1/2019 |
| EP | 3660324 A1 | 6/2020 |
| IT | TO20100347 A1 | 10/2011 |
| JP | 4994024 B2 | 8/2012 |
| KR | 101965811 B1 | 8/2019 |

OTHER PUBLICATIONS

International Search Report and Written Opinion issued in corresponding International Application No. PCT/US2021/056162 dated Jan. 21, 2022, 13 pages.

* cited by examiner

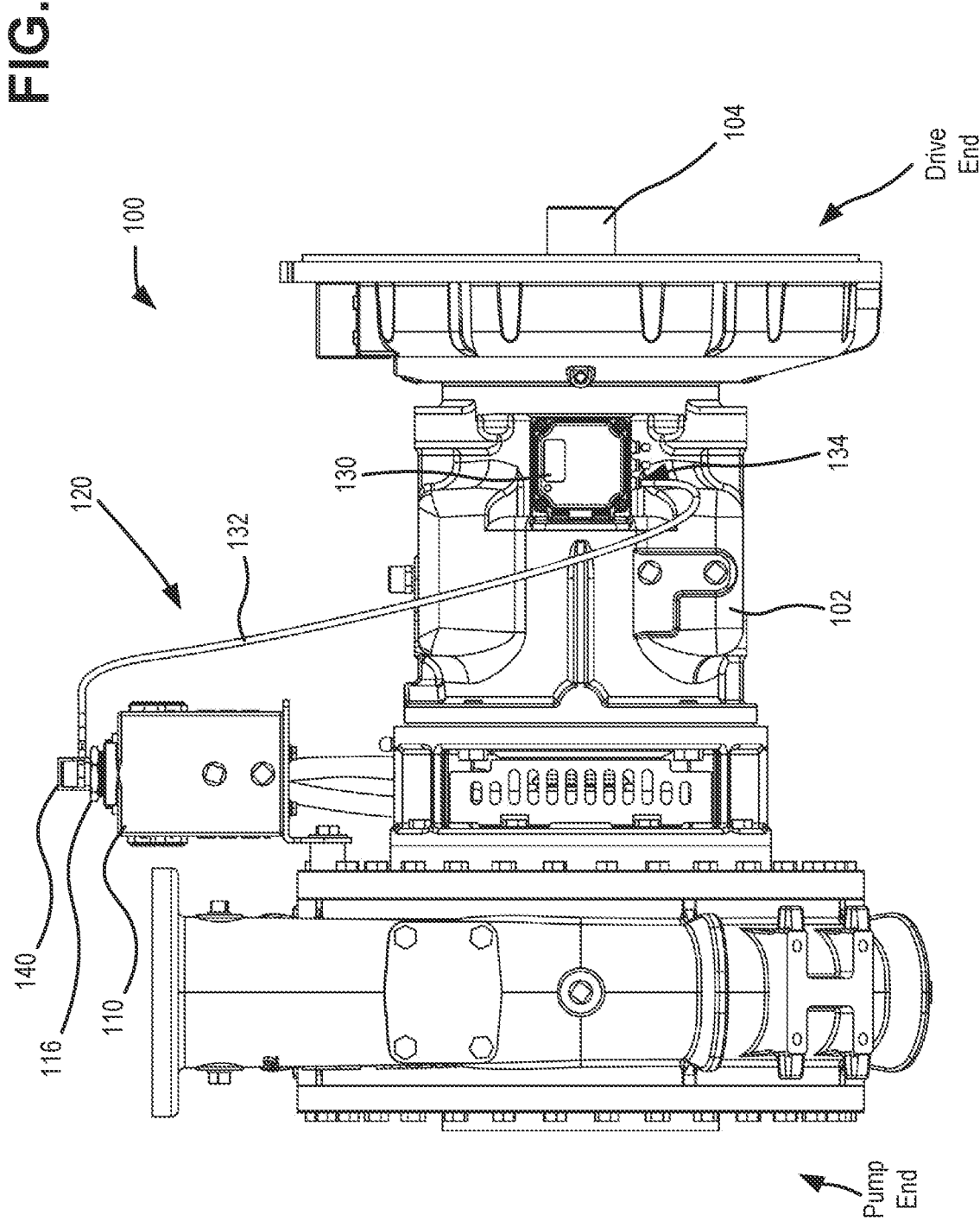

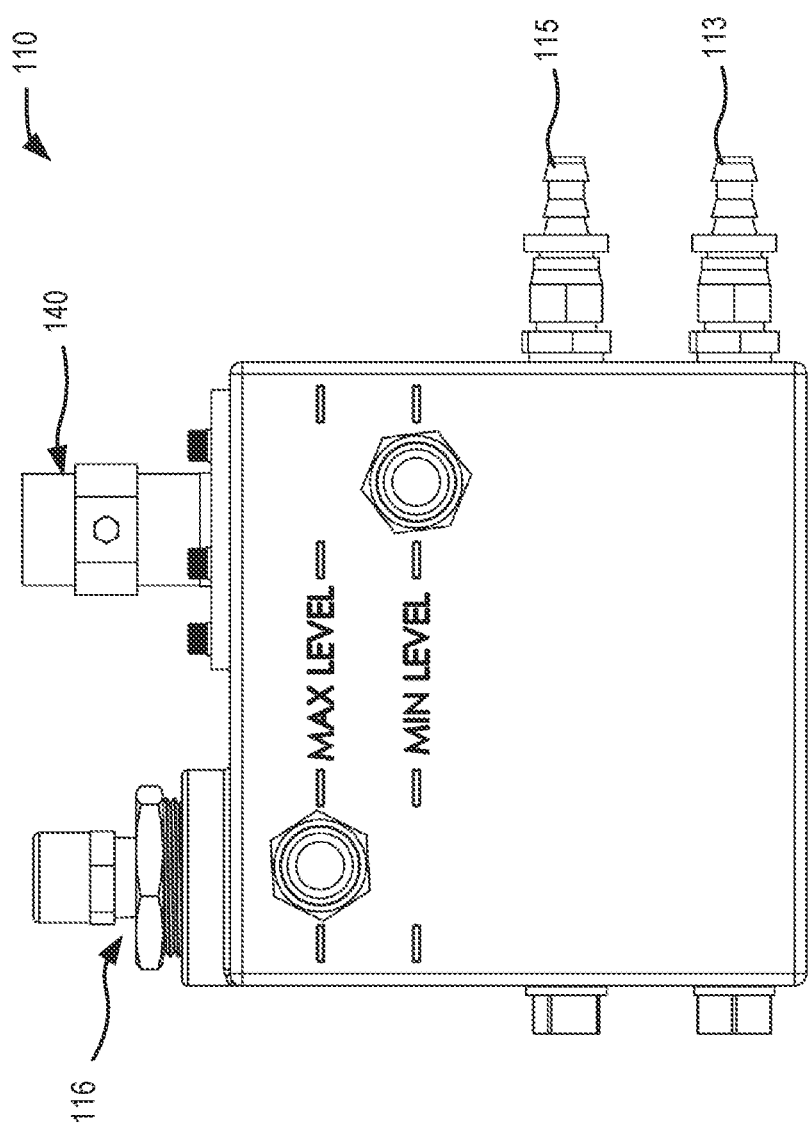

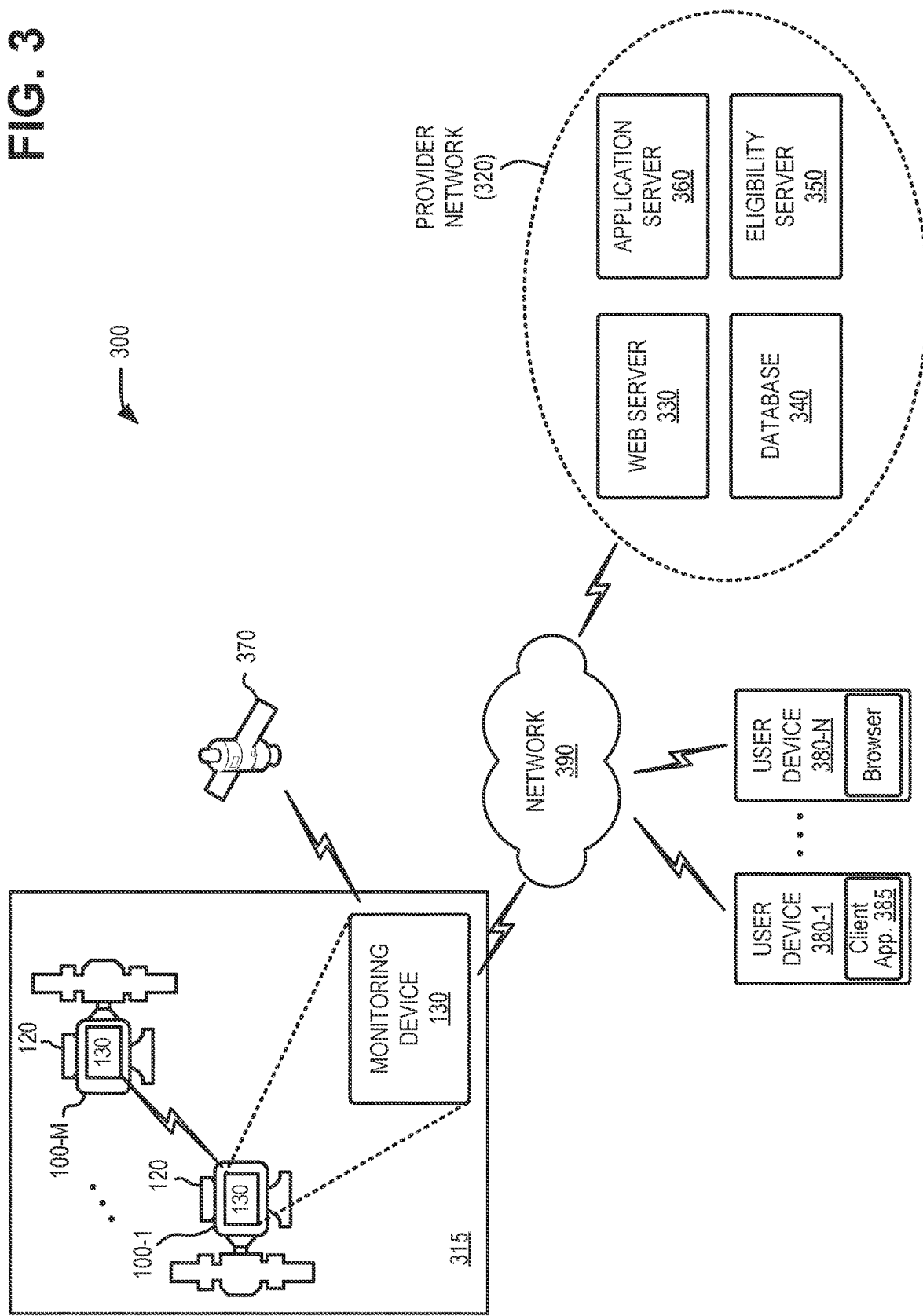

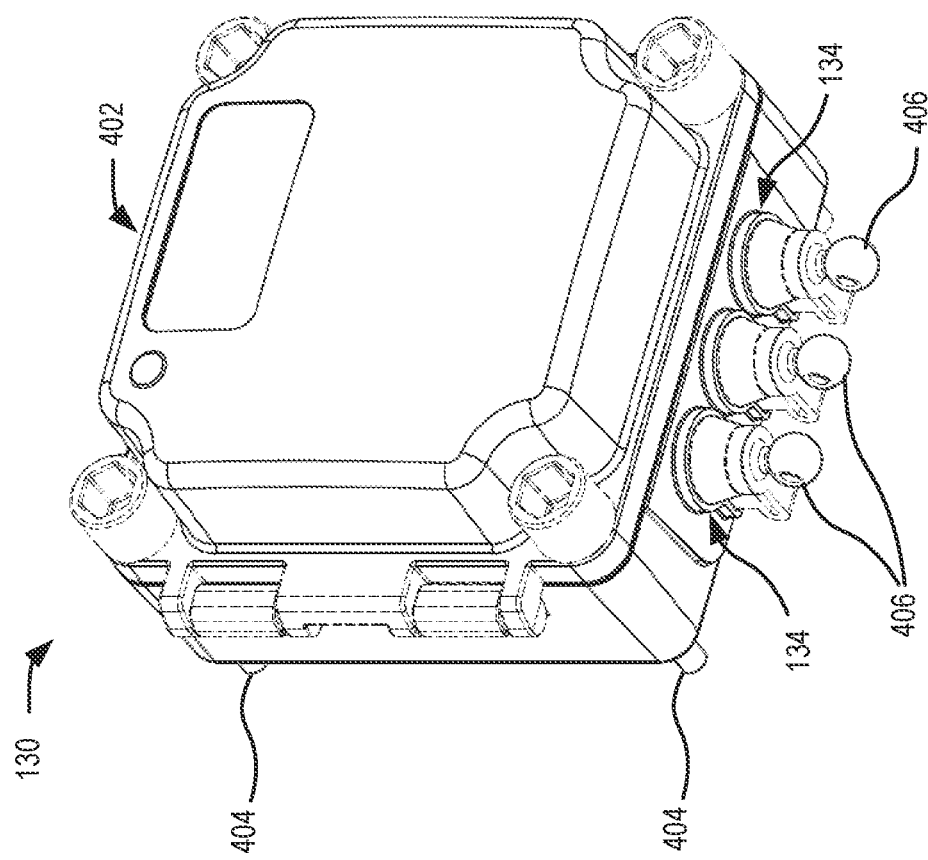

though the pump). The reservoir is connected to the pump by a set of hoses which allows the fluid to flow from the reservoir through openings in the pump housing and onto the seal faces.

MONITORING SYSTEM FOR PUMP WITH MECHANICAL SEAL LUBRICATION ARRANGEMENT

CROSS-REFERENCE TO RELATED APPLICATION

This application claims priority to under 35 U.S.C. § 119, based on U.S. Provisional Patent Application No. 63/104,800 filed Oct. 23, 2020, titled "Monitoring System for Pump with Mechanical Seal Lubrication Arrangement," the disclosure of which is hereby incorporated by reference.

BACKGROUND OF THE INVENTION

Industrial pumps may use seals to prevent leakage, particularly at locations where a rotating shaft passes through a stationary housing. When these seals are damaged, repair/replacement of the seals can cause significant down time, since accessing the seals is labor-intensive and typically requires disassembling the pump. A common failure mechanism for seals is running the pump dry (e.g., without pumping fluid). When there is no lubricating fluid on the mechanical seals, heat from friction can quickly cause damage to the seal materials, leading to seal failure. A seal failure can quickly lead to cascading failures in other parts of the pump, such as intrusion of pumped fluids into the pump bearings.

BRIEF DESCRIPTION OF THE DRAWINGS

FIGS. 1A and 1B are right and left side views, respectively, of pump equipment according to an implementation described herein;

FIGS. 2A, 2B, and 2C are rear perspective, top, and front views, respectively, of reservoir of FIG. 1A;

FIG. 3 is a diagram of a network environment in which systems and methods described herein may be implemented;

FIG. 4 is a front perspective view of an exemplary monitoring device, according to an implementation;

DETAILED DESCRIPTION OF THE PREFERRED EMBODIMENTS

The following detailed description refers to the accompanying drawings. The same reference numbers in different drawings may identify the same or similar elements. Also, the following detailed description does not limit the invention.

An industrial pump system may include a reservoir that is filled with a lubricating fluid (e.g., water, a light oil, a water/propylene glycol mix, etc.), which is used to lubricate mechanical seal faces on the pump shaft in the event the pump is run "dry" (e.g., without any pumped liquid running Fluid level changes in the lubrication reservoir can be evidence of seal leak or another problem with the seal lubrication system. Examples of situations when the level of the fluid in the reservoir can drop include: (1) fluid in the reservoir decreases over time due to natural evaporation, small leaks in the system, and the fluid evaporating at the seal face because of the increased temperature; and (2) a catastrophic seal failure occurs, causing rapid level changes in the reservoir. In either of the above situations, observation of the pump/reservoir would typically be required to see the level of the fluid in the reservoir. In the event a low reservoir level is observed, prompt responsive action may limit or prevent damage to the pump. Conversely, increased fluid levels in the lubrication reservoir may be indicative of a kink or clog in the lubrication distribution system.

Systems and methods described herein provide pump equipment with an integrated seal lubrication system and remote monitoring. A level sensor is installed in a lubrication reservoir. The level sensor is connected to a monitoring device or an industrial internet-of-things (IIoT) device to monitor the level of the lubricating fluid in the reservoir. The monitoring device gives pump users the ability to monitor lubrication reservoir levels, along with other pump metrics, remotely. The monitoring device provides a wireless connection to a remote equipment monitoring system. Using communications through a provider network, users may access a user portal to receive alerts and configure alert settings for the level sensor. For example, when threshold limits for reservoir levels are crossed, the equipment monitoring system can push an alert message (e.g., via email or text message) to a pump user, owner, or maintenance personnel. Additionally, the monitoring device may be configured to automatically shut down the pump equipment when low lubrication reservoir levels are detected.

In contrast with conventional pump seal lubrication systems, systems and methods described herein allow the level of the fluid in the lubrication reservoir to be monitored without a person physically present at the pump site. Furthermore, automatic pump shutdowns may be configured to prevent seal damage when the pump is operated without pumped liquid running though the pump.

Figure 1B:
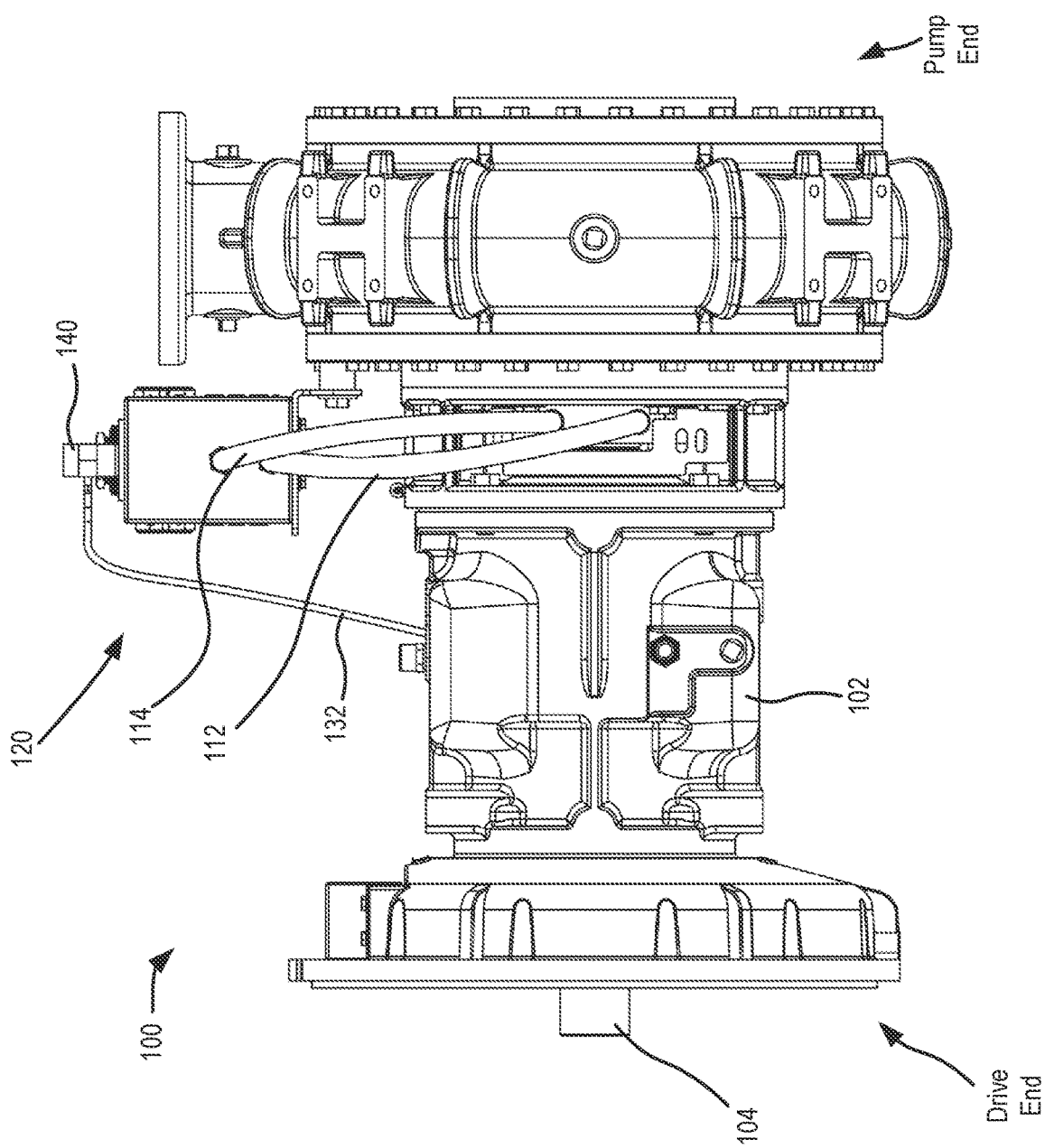
Figure 1C:
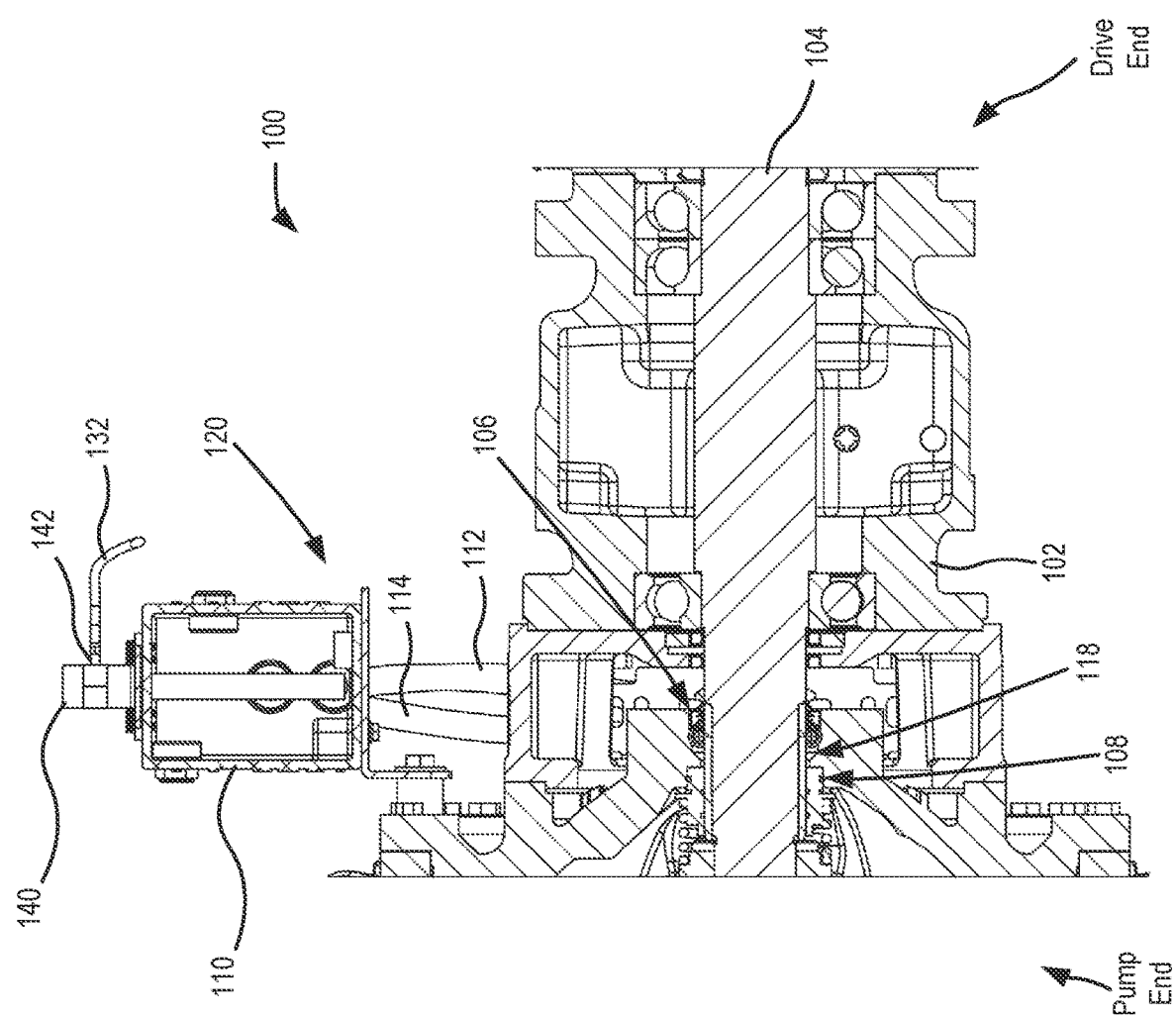
FIG. 1C is a side cross-sectional view of a portion of the pump equipment FIG. 1A.

FIGS. 1A and 1B are right and left side views, respectively, of pump equipment 100, according to an implementation described herein. Pump equipment 100 may include a pump bearing frame 102 that supports a rotating shaft 104. As shown in FIG. 1C, for example, an outer lip seal 106 and a mechanical seal assembly 108 surround a portion of shaft 104. As described above, seals 106 and 108 require lubrication when the pump is run dry to prevent damage to seals 106 and/or 108 (collectively referred to herein as "shaft seals 106/108").

Figure 2A:
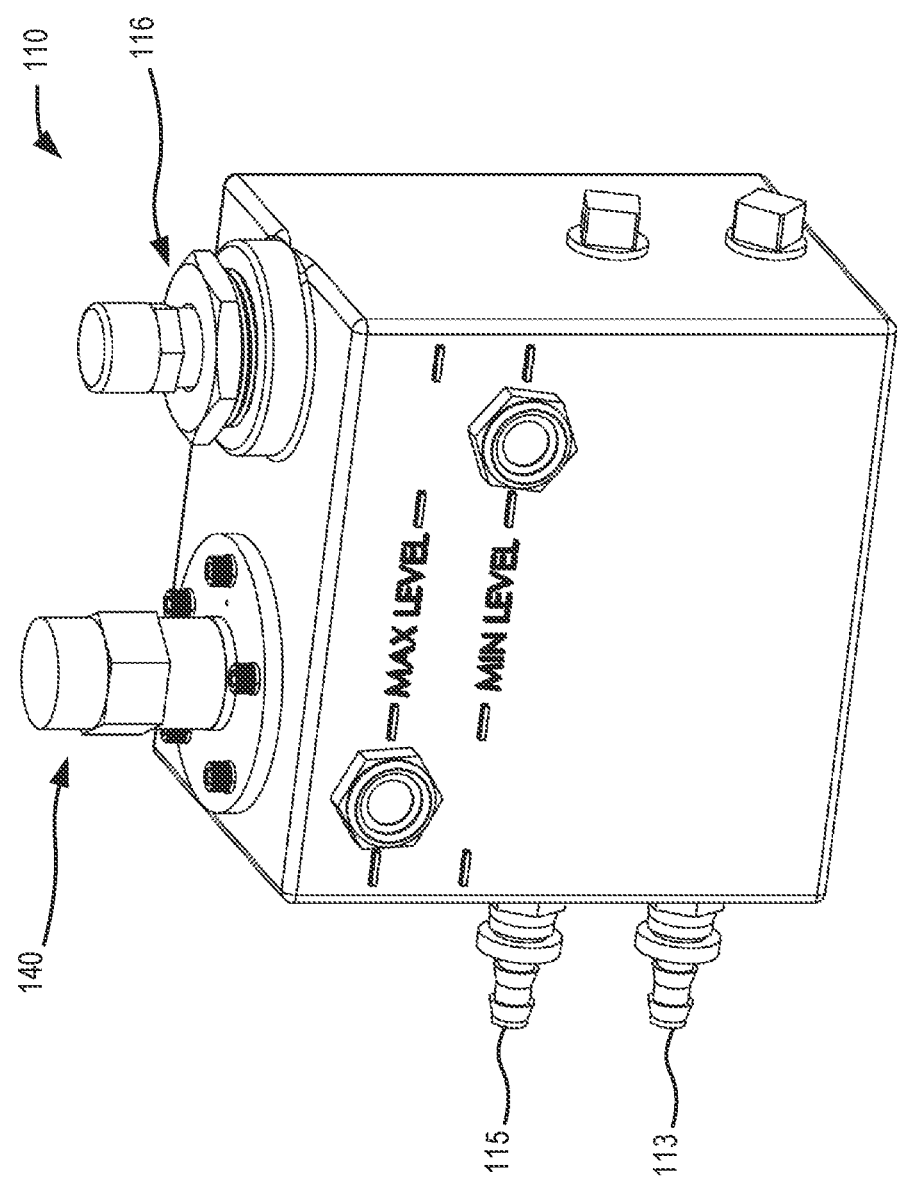
Figure 2B:
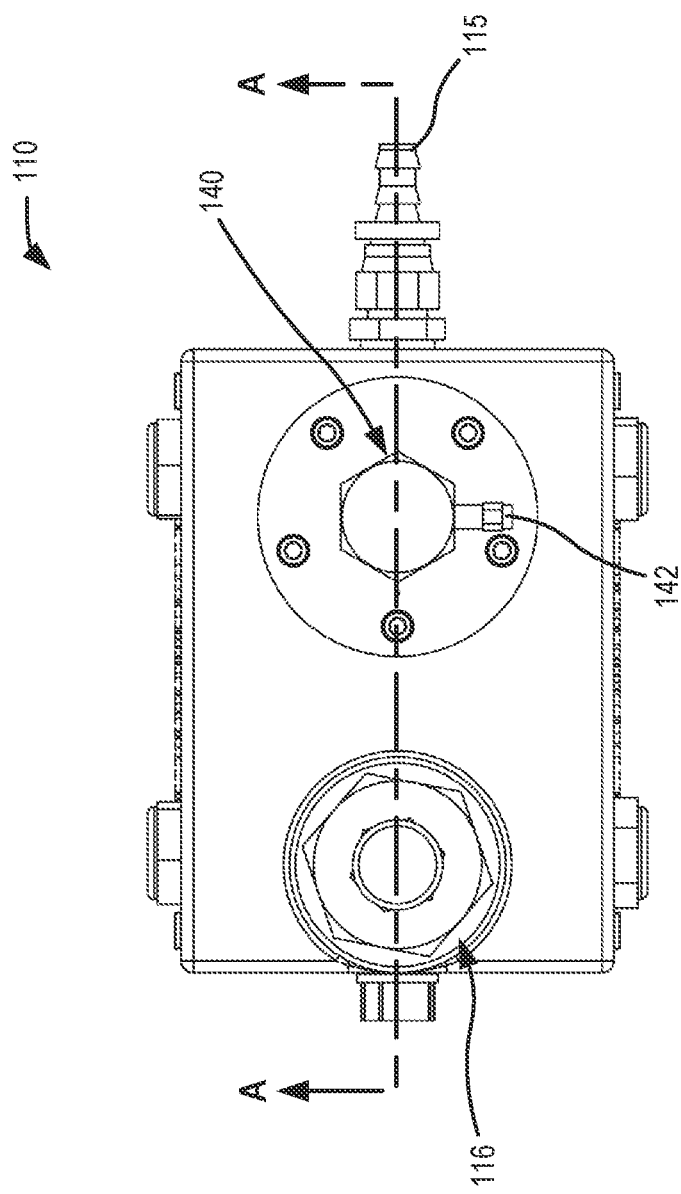
Figure 2D:
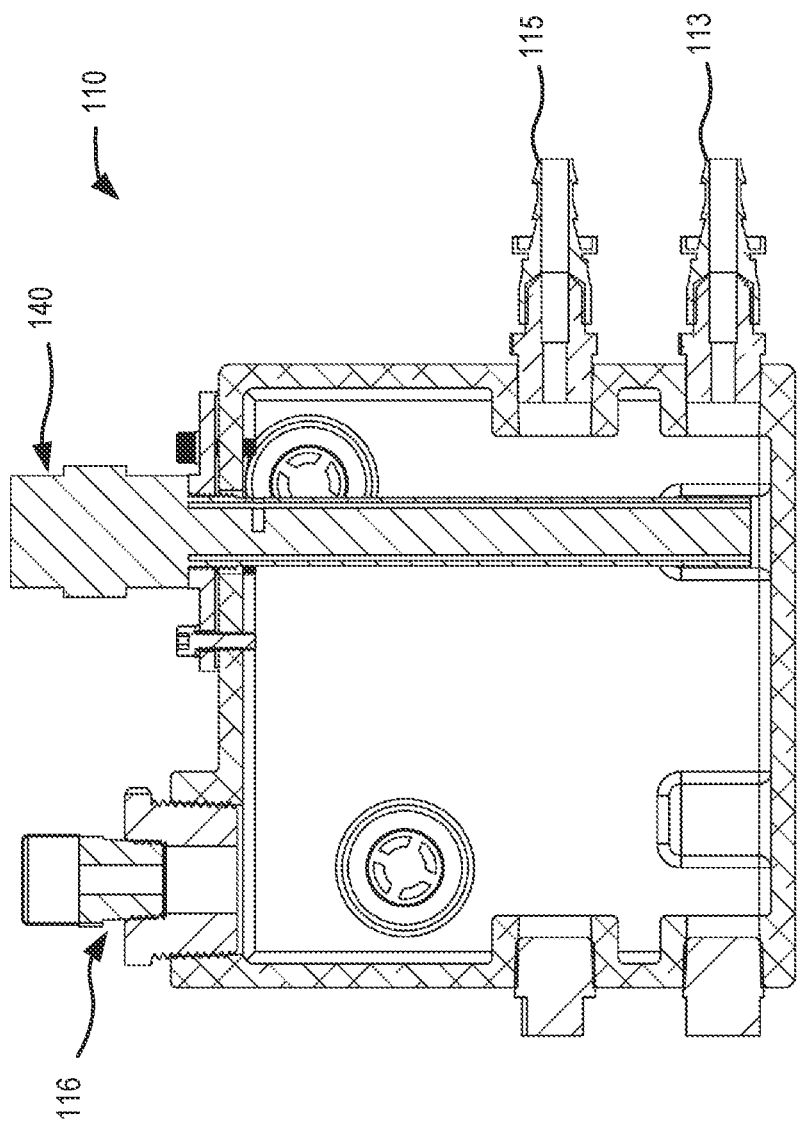
FIG. 2D is a front cross-sectional view of the reservoir of FIG. 2C.

A reservoir 110 is mounted to pump bearing frame 102 (or another external surface of pump equipment 100). FIGS. 2A, 2B, 2C are rear perspective, top, and front views of reservoir 110, while FIG. 2D is a side cross-sectional view of reservoir 100 taken along section A-A of FIG. 2B. Referring collectively to FIGS. 1A-2D, reservoir 110 may include a container to hold lubricant fluid, such as water, oil, propylene glycol, or a mixture thereof. A feed line 112 is connected to an exit port 113 at a lower part of reservoir 110, and a return line 114 is connected to an entry port 115 of reservoir 110 above the feed line 112 connection. Feed line 112 may include a flexible hose, for example, that feeds lubricant from reservoir 110 into a lubrication gland 118 located between seals 106 and 108. Gland 118 may be housed within pump bearing frame 102 around shaft 104. Gland 118 may be sealed on the drive end by outer lip seal 106 operating on a portion of shaft 104 and on the pump end by mechanical seal assembly 108. Thus, gland 118 prevents a fluid from leaking away from shaft 104. Gland 118 may contain two ports: a lower port for feed line 112 and an upper port for return line 114. Return line 114 may include another flexible hose, for example, that returns lubricant from lubrication gland 118 back to reservoir 110.

Lubrication reservoir 110 may be positioned above pump frame 102 with feed line 112 running down to gland 118. Lubrication reservoir 110 may also include a vented cap 116 to allow gravity to draw lubricant through feed line 112. In operation, lubricant leaves the lower portion of the reservoir through port 113 and feed line 112 and enters the bottom of gland 118. Rotation of shaft 104 provides pumping action for continuous circulation of the lubricant from reservoir 110 into gland 118 through feed line 112 and back to reservoir 110 through return line 114 and port 115. Through circulation of the lubricant, heat is transferred from mechanical seal assembly 108 back to reservoir 110. The cycling of the lubricant through reservoir 110 allows the lubricant the opportunity to dissipate the heat and ensures that sufficient amount of lubricant is available for gland 118. Continuous presence of the lubricant in gland 118 keeps the faces of shaft seals 106/108 lubricated during dry run operations, such as during priming, re-priming, or standby operations.

As further shown in FIG. 1A, for example, a monitoring device 130 may be mounted to pump bearing frame 102. Monitoring device 130 may include a housing configured for physical attachment, as a single unit, to a mounting surface on the outside of pump bearing frame 102. Monitoring device 130 may include an Internet of Things device (e.g., an IIoT device), a Machine Type Communication (MTC) device, a machine-to-machine (M2M) device, an enhanced MTC device (eMTC) (also known as Cat-M1), an end node employing Low Power Wide Area (LPWA) technology such as Narrow Band (NB) IoT (NB-IoT) technology, or some other type of wireless end node. According to various exemplary embodiments described further herein, monitoring device 130 may include hardware, such as a processor, application-specific integrated circuit (ASIC), a field-programmable gate array (FPGA), or a combination of hardware and software (e.g., a processor executing software) to execute various types of functions. Monitoring device 130 may be a multipurpose device including calibrated sensors to collect vibration, temperature, and/or other pump data, and forward the collected data via a wireless interface for access by users. As described further herein, monitoring device 130 may also include a port to receive signals from a level sensor 140 for lubrication reservoir 110. Monitoring device 130 may further include logic to forward and/or act on received signals from level sensor 140.

Reservoir 110, hoses 112/114, and gland 118 collectively form a lubrication system 120 that acts as a near-closed loop system when the integrity of shaft seals 106/108 remains intact. Thus, the level of lubricant in reservoir 110 may be expected to remain constant unless there is a seal failure or an irregularity in lubrication system 120.

Reservoir 110 may include level sensor 140 installed to detect a fluid level in reservoir 110. According to one implementation, level sensor 140 may include a liquid level sensor, such as a self-calibrating capacitive level sensor. In other implementations, level sensor 140 may be implemented, for example, as an ultrasonic level sensor, a float level sensor, etc. Level sensor 140 may be mounted on reservoir 110, as shown in FIGS. 1C and 2D, or adjacent reservoir 110. According to one implementation, level sensor 140 may be configured to measure liquid height in reservoir 110 in a specified range. For example, level sensor 140 may measure between a low and a high threshold, determine a volume percentage level, or provide a range among multiple threshold levels (e.g., low, medium, full, etc.). Level sensor 140 may include a communication interface 142 to transfer measurement data to monitoring device 130.

According to an implementation, sensor 140 may transfer measurement data to monitoring device 130 via a wired connection (e.g., wired interface 132) connected at one of ports 134. According to another implementation, sensor 140 may transfer measurement data to monitoring device 130 via a wireless signal, using a short-range wireless standard, such as a Bluetooth connection. Monitoring device 130 may receive measurement data from sensor 140. For example, monitoring device 130 may receive continuous fluid level readings or periodic fluid level readings. According to one implementation, monitoring device 130 may be configured to temporarily store, upload, and/or and generate alert signals based on the fluid level readings.

FIG. 3 is a diagram illustrating an exemplary environment 300 in which systems and/or methods described herein may be implemented. As illustrated, environment 300 may include pump equipment 100-1 through 100-M (collectively and individually referred to herein as "pump equipment 100"). Each of pump equipment 100 may be provided with a lubrication system 120 and a mounted monitoring device 130. Pump equipment 100 with lubrication system 120 and monitoring devices 130 may be distributed/provided throughout customer premises 315, such as an industrial, commercial, educational, or agricultural environment, for example. Environment 300 may also include a provider network 320 with a web server 330, a database 340, an eligibility server 350, and an application server 360; a global positioning system (GPS) 370; and user devices 380-1 through 380-N interconnected by a network 390. Components of environment 300 may be connected via wired and/or wireless links.

Provider network 320 may include network devices, computing devices, and other equipment to provide services, including services for customers with monitoring devices 130. For example, devices in provider network 320 may supply backend services to user devices 380 for remotely monitoring pump equipment 100. Provider network 320 may include, for example, one or more private Internet Protocol (IP) networks that use a private IP address space. Provider network 320 may include a local area network (LAN), an intranet, a private wide area network (WAN), etc. According to an implementation, provider network 320 may use vendor-specific protocols to support IoT management. In another implementation, provider network 320 may include a hosting platform that provides an IoT data service. The IoT data service may include receiving packets that are transmitted by monitoring devices 130 and implementing models to collect, store, analyze, and/or present event data from monitoring devices 130. The hosting platform may also provide data-driven applications and/or analytics services for user devices 380 that owners of monitoring devices 130 may use. Examples of hosting platforms that may use different protocols and commands include Amazon® Web Services (AWS), Microsoft Azure®, IBM Watson®, Verizon® ThingSpace®, etc. Although shown as a single element in FIG. 3, provider network 320 may include a number of separate networks.

Web server 330 may include one or more network or computational devices to manage service requests from eligible user devices 380. In one implementation, web server 330 may provide an application (e.g., an event data management application) and/or instructions to user device 380 to enable user device 380 to receive and respond to information related to pump equipment 100. In another implementation, as described further herein, web server 330 may provide multiple types of browser-based user interfaces to facilitate individual pump monitoring, system monitoring, receive alerts, receive notifications, etc. Web server 330 may receive settings from user devices 380, may process/collate the received settings, and may forward the settings to application server 360 for implementation.

Database 340 may include one or more databases or other data structures to store data uploads from monitoring devices 130, reporting/monitoring configurations, device registrations (e.g., provided by user devices 380 via web server 330) and/or user registrations. In one implementation, database 340 may also store data retrieved from and/or used by eligibility server 350.

Eligibility server 350 may include one or more network or computational devices to provide backend support for authorizing monitoring devices 130 and/or user devices 380 to use provider network 320. For example, eligibility server 350 may perform a provisioning process for a monitoring device 130, including authentication, registration, and activation in network 390. Additionally, or alternatively, eligibility server 350 may store identification information for registered users and/or user devices 380. The information may be used to verify that a particular user/user device 380 has access to services and/or information provided by provider network 320. Upon verifying eligibility of a user/user device 380, eligibility server 350 may, for example, provide access to other devices in provider network 320.

Application server 360 may include one or more network or computational devices to perform services accessed through web server 330. For example, application server 360 may manage downloading applications provided to user devices 380, may process incoming data (e.g., from monitoring devices 130) for storage in database 340, and/or provide configuration information to monitoring devices 130. According to an implementation, application server 360 may use a series of application programming interfaces (APIs) to send and receive data from monitoring devices 130. For example, monitoring device 130 may forward to application server 360 periodic uploads of fluid level data from level sensor 140. In other aspects, monitoring device 130 may forward to application server 360 real-time alerts for low (or high) fluid level readings from level sensor 140. Application server 360 may store historical data records from level sensor 140 in database 340. Application server 360 may also report alerts to registered users.

Positioning system 370 may include one or more devices configured to provide location information to monitoring devices 130. In some implementations, location information may include, for example, GPS information or another form of global navigation satellite system (GNSS) information. In one implementation, positioning system 370 may include one or more cellular towers, wherein user devices may retrieve location information in the form of cellular tower triangulation information. Additionally, or alternatively, positioning system 370 may include a GPS satellite to determine a location of monitoring device 130 and/or pump equipment 100.

User device 380 includes a device that has computational and wireless communication capabilities. User device 380 may be implemented as a mobile device, a portable device, a stationary device, a device operated by a user, or a device not operated by a user. For example, user device 380 may be implemented as a smartphone, a computer, a tablet, a wearable device, or some other type of wireless device. According to various exemplary embodiments, user device 380 may be configured to execute various types of software (e.g., applications, programs, etc.). As described further herein, user device 380 may download and/or register a client application 385. As described further herein, the client application 385 (or "app") may be designed to access, from provider network 320, data reported by monitoring devices 130. For example, client application 385 may provide a user interface (UI) to solicit configuration settings and data requests from a user. In another implementation, user device 380 may use a web browser to connect to web server 330 and perform similar functions of client application 385.

Network 390 may include one or more wired, wireless and/or optical networks that are capable of receiving and transmitting data, voice and/or video signals. For example, network 390 may include one or more access networks, IP multimedia subsystem (IMS) networks, core networks, or other networks. The access network may include one or more wireless networks and may include a number of transmission towers for receiving wireless signals and forwarding wireless signals toward the intended destinations. The access network may include a wireless communications network that connects subscribers (e.g., monitoring devices 130, user devices 380, etc.) to other portions of network 390 (e.g., the core network). In one example, the access network may include a long-term evolution (LTE) network. In other implementations, the access network may employ other cellular broadband network standards such as 3rd Generation Partnership Project (3GPP) 5G and future standards. Network 390 may further include one or more satellite networks, one or more packet switched networks, such as an IP-based network, a local area network (LAN), a wide area network (WAN), a personal area network (PAN) (e.g., a wireless PAN), a wireless local area network (WLAN), an intranet, the Internet, or another type of network that is capable of transmitting data.

In FIG. 3, the particular arrangement and number of components of environment 300 are illustrated for simplicity. In practice there may be more monitoring devices 130, provider networks 320, web servers 330, databases 340, eligibility servers 350, application servers 360, positioning systems 370, user devices 380, and/or networks 390. For example, there may be hundreds or thousands of monitoring devices 130.

FIG. 4 is a front perspective view of an exemplary monitoring device 130. Monitoring device 130 may be mounted to a mounting surface of pump equipment 100. For example, a mounting surface of monitoring device 130 may be a flat machined surface on pump bearing frame 102. In one implementation, pump bearing frame 102 may include mounting holes configured to receive threaded mounting pins 404 (e.g., screws). Mounting pins 404 may be inserted through housing 402 of monitoring device 130 and secured in the mounting holes of pump bearing frame 102 to attach monitoring device 130. When attached to pump bearing frame 102, pump indicators, such a vibration and temperature, can be detected by sensors internal to monitoring device 130.

Housing 402 may provide a dust-resistant and water-spray resistant enclosure to protect internal components described further herein. Housing 402 may also include covered access ports 134, the covers 406 of which may be removed/opened to provide access to connectors/ports 134 for external sensors, such as wired connections to level sensor 140. For example, connections to components internal to housing 402 may be accessed through covered access ports 134 (e.g., when covers 406 are opened) and used for wired connections to level sensor 140 or other external sensors. According to an implementation, one or more of covered access ports 134 may also provide for a direct current (DC) power connection to an external power source. Housing 402 may be generally compact in size and structurally rigid (e.g., hard plastic material) to allow for mounting on pump bearing frame 102.

Figure 5:
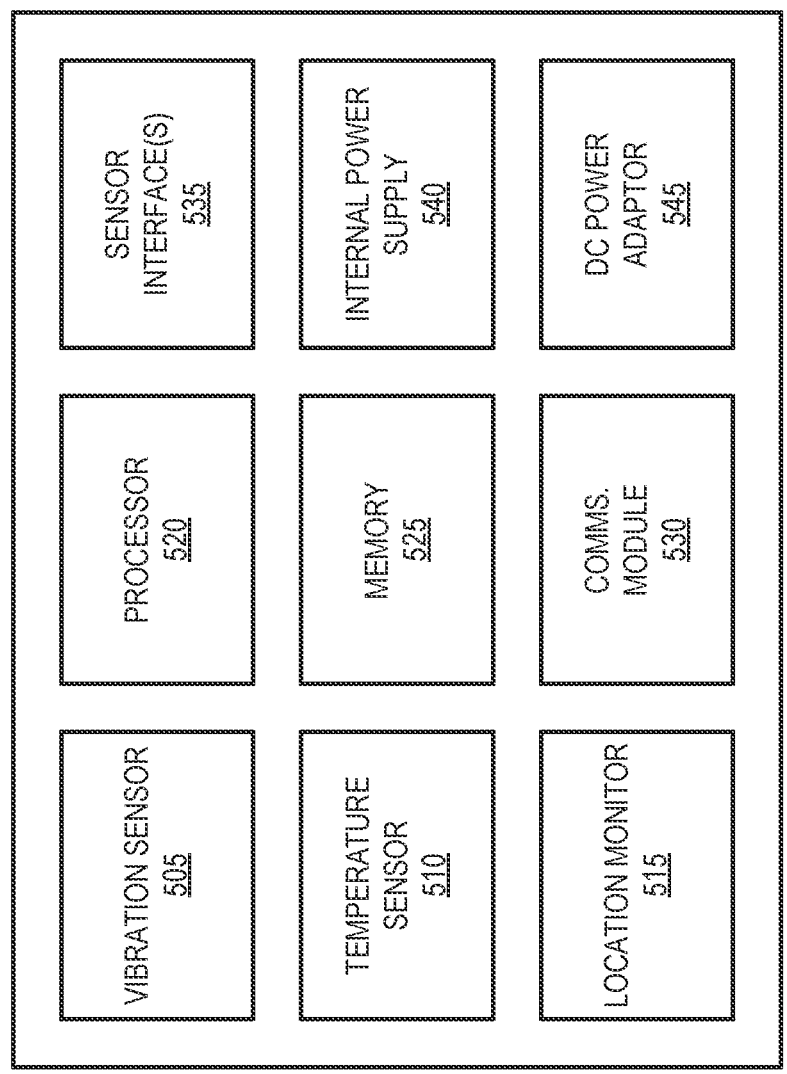
FIG. 5 is a block diagram illustrating internal components of the monitoring device of FIG. 4.

FIG. 5 is a block diagram of internal components of monitoring device 130. As shown in FIG. 5, monitoring device 130 may include a vibration sensor 505, a temperature sensor 510, a location monitor 515, a processor 520, a memory 525, a communications module 530, sensor interfaces 535, an internal power supply 540, and a power adaptor 545. The internal components may be enclosed, for example, within housing 402. According to an implementation, one or more components may be installed on a printed circuit board, an etched wiring board, or a printed circuit assembly.

Vibration sensor 505 may include accelerometers, signal amplifiers, and filters to detect and indicate sensed vibration in different directions. For example, vibration sensors 505 may include a set of three accelerometers to measure vibration along three respective axes. In another implementation, vibration sensors 505 may measure vibration along two axes.

Temperature sensor 510 may include a sensor to detect a temperature within housing 402. The internal temperature of housing 402 may generally correspond to the temperature of the pump bearing fame 102 of pump equipment 100. For example, changes in the temperature of pump bearing fame 102 will typically cause proportional temperature changes in the housing 402 of monitoring device 130.

Location monitor 515 may communicate with positioning system 370, for example, to detect a location of monitoring device 130. For example, location monitor 515 may include a location identification system (e.g., global positioning system (GPS) or another assisted location determining system).

Processor 520 may include one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 520 may be implemented as hardware (e.g., a microprocessor, etc.), a combination of hardware and software (e.g., a SoC, an ASIC, etc.) and may include one or multiple memories (e.g., memory 525, cache, etc.).

Processor 520 may control the overall operation or a portion of operation(s) performed by monitoring device 130. Processor 520 may collect sample readings from vibration sensor 505, temperature sensor 510, location monitor 515, sensors (e.g., level sensor 140) connected to sensor interfaces 535, internal power supply 540, and/or power adaptor 545. Processor 520 may determine sampling rates and available functions based on whether internal battery power or external power is used. Processor 520 may cause sample data to be sent to provider network 320 on a periodic basis. Processor 520 may also be programmed to detect if readings from any sensors exceed a predetermined threshold value and generate an alert signal when a threshold is exceeded. Functions of processor 520 are described further in connection with, for example, FIG. 6.

Memory 525 includes one or multiple memories and/or one or multiple other types of storage mediums. For example, memory 525 may include random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory (e.g., a NAND flash, a NOR flash, etc.), and/or some other type of memory. Alternatively, or additionally, memory 525 may include a Micro-Electromechanical System (MEMS)-based storage medium, and/or a nanotechnology-based storage medium. Memory 525 may store data (e.g., from vibration sensor 505, temperature sensor 510, location monitor 515, level sensor 140, other sensors connected to sensor interfaces 535, internal power supply 540, and/or power adaptor 545), software, and/or instructions related to the operation of monitoring device 130. According to another implementation, memory 525 may store fluid level thresholds, such as maximum and/or minimum thresholds for level sensor 140.

Communications module 530 permits monitoring device 130 to communicate with other devices, networks, systems, devices, and/or the like. According to implementations described herein, communications module 530 includes multiple wireless interfaces. For example, communications module 530 may include multiple transmitters and receivers, or transceivers. Communications module 530 may include one or more antennas. For example, communications module 530 may include an array of antennas. Communications module 530 may operate according to one or more communication standard.

According to one implementation, communications module 530 may include a cellular module, a wireless personal area network (WPAN) module, and a radio module. The cellular module may include a cellular radio transceiver, which may operate according to any known cellular standard, including the standards known generally as 3GPP Fourth Generation (4G), 5.5 Generation (4.5G), or Fifth Generation (5G) mobile wireless standards. The cellular module may enable monitoring device 130 to conduct IoT communications with, for example, provider network 320. The WPAN module may include a radio transceiver for a wireless personal area network (e.g., using IEEE 802.15 standards or Bluetooth®). The WPAN module may enable monitoring device 130 to transfer data to user device 380 when user device 380 is within a relatively short distance of monitoring device 130 (e.g., up to about 30 feet). The radio module may include a radio transceiver operating in an unlicensed spectrum (e.g., 900 MHz, 2.4 GHz). For example, the radio module may be based on an RJ45 Ethernet interface, a point-to-point radio interface, or a point-to-multipoint radio interface. The radio module may enable communications between different monitoring devices 130, such as monitoring devices 130 in the same industrial, commercial, educational, factory, or agricultural space over a range of thousands of feet.

Sensor interface 535 may include one or more interfaces to receive analog or digital data from sensors and/or Modbus-enabled devices that are external to monitoring device 130. For example, sensor interface 535 may include interfaces to accept hard-wired inputs (e.g., via wired interface 132) from level sensor 140, pump pressure sensors, flow sensors, rotation speed sensors, etc. (e.g., via wired connections when covers 406 of access ports 134 are removed). According to an implementation, multiple sensor interfaces 535 (e.g., 3, 5, 8, etc.) may be used with monitoring device 130. According to one implementation, level sensor 140 may use sensor interface 535 to periodically or continuously report fluid levels in reservoir 110. Additionally, or alternatively, sensor interface 535 may enable level sensor 140 to report unscheduled reservoir level events, such as when a fluid level passes a monitored threshold for reservoir 110. In another implementation, raw fluid level data reported via sensor interface 353 may be interpreted by logic in monitoring device 130.

Internal power supply 540 may include one or more batteries (e.g., a rechargeable battery, a replaceable battery, etc.) to power other components of monitoring device 130. Internal power supply 540 may include, for example, a conventional consumer-sized battery (e.g., size AA, 9-volt, etc.). In one implementation, internal power supply 540 may include a voltage monitor to measure a battery level (e.g., voltage of a battery).

External power adaptor 545 may include a connection for a direct current (DC) power source (e.g., from a storage device such as an external battery) or another power source. Generally, when an external power source is connected to external power adaptor 545, monitoring device 130 operates using the external power source instead of internal power supply 540.

Although FIG. 5 shows exemplary components of monitoring device 130, in other implementations, monitoring device 130 may contain fewer, different, differently-arranged, or additional components than depicted in FIG. 5. Additionally, or alternatively, a component of monitoring device 130 may perform one or more other tasks described as being performed by another component of monitoring device 130.

Figure 6:
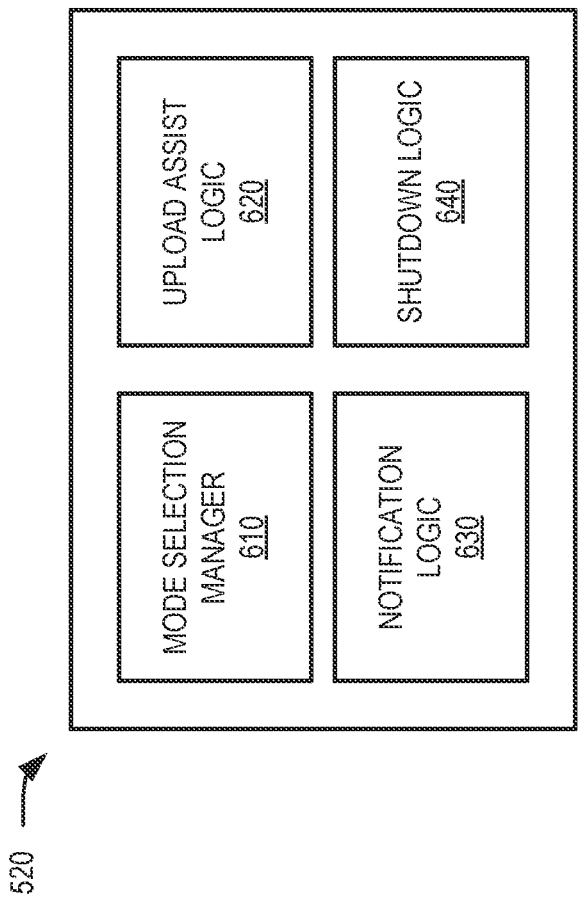
FIG. 6 is a diagram of exemplary logical components of the processor of FIG. 5.

FIG. 6 is a diagram of exemplary logical components of monitoring device 130. As shown in FIG. 6, monitoring device 130 may include a mode selection manager 610, upload assist logic 620, notification logic 630, and shutdown logic 640. Functions of logical components of FIG. 6 may be performed, for example, by processor 520 configured to execute instructions stored in memory 525.

Mode selection manager 610 may detect what power source (e.g., internal battery 540 or external power through DC adaptor 545) is used by monitoring device 130 and select an appropriate operating mode for the current power source. Generally, mode selection manager 610 may select a mode with fewer features and less power consumption for internal battery power and a different mode with full features and greater power consumption for external power. For example, mode selection manager 610 may select a low power mode when only power from internal power supply 540 is available. Conversely, mode selection manager 610 may select a full feature mode when an external power source in connected through DC power adaptor 545.

Mode selection manager 610 may apply configurable settings for sensor data sampling and data uploads that optimize performance and features of monitoring device 130. For example, mode selection manager 610 may collect sensor data from both external sensors (e.g., level sensor 140 connected via wires through access ports 134) and internal sensors (e.g., vibration sensor 505, temperature sensor 510, and location monitor 515). In one aspect, mode selection manager 610 may obtain data samples from external sensors and internal sensors at configured periodic intervals, and provide data uploads at different configured intervals. In one implementation, mode selection manager 610 may include a default data reporting configuration, such as twenty samples per hour of any internal and external sensors and eight data uploads per day (e.g., via a broadband cellular connection). In another implementation, one or more data reporting settings may be configured by a user e.g., using instructions provided to monitoring device 130 from provider network 320 via client application 385).

Upload assist logic 620 may manage data uploads to provider network 320 based on settings selected by mode selection manager 610. For example, upload assist logic 620 may initiate a data session with application server 360 (e.g., broadband cellular module via communications module 530 and network 390) to perform an upload of data samples at periodic intervals governed by the currently selected mode. In another implementation, upload assist logic 620 may use a WPAN module to conduct data uploads (e.g., when a broadband cellular connection is not available) to a local user device 380. For example, upload assist logic 620 may detect, via a Bluetooth component, a user device 380 with a client application 385. If upload assist logic 620 detects stored data samples (e.g., from internal sensors or external sensors) that have not been uploaded from monitoring device 130, upload assist logic 620 may use a WPAN connection with user device 380 to transfer data to client application 385. Upload assist logic 620 may upload the stored data samples to user device 380/client application 385, which may automatically forward the data samples to provider network 320 whenever user device 380 has a broadband cellular connection. According to one implementation, the data samples uploaded from monitoring device 130 to user device 380 are not configured for presentation by user device 380. Instead, user device 380/client application 385 may access provider network 320 for access to data from monitoring device 310. Thus, provider network 320 may maintain secure access to all uploaded data via eligibility server 350.

Notification logic 630 may manage transmission of periodic reports or alert signals for detection of out-of-compliance behavior. For example, notification logic 630 may store and identify preset thresholds, which may be provided as part of a user configuration or factory defaults. Thresholds may include, for example, reservoir levels (e.g., certain percentages, high/low levels, etc.), vibration deviations, temperature limits, pressure limits, flow rates, etc. Notification logic 630 may determine when numerical values of each data samples from any of the internal sensors or external sensors exceed one of the corresponding thresholds. When a threshold is exceeded, notification logic 630 may send an alert signal to provider network 320. The alert signal may include, for example, a time, a value (e.g., a threshold level or percentage), a sensor identifier (e.g., for level sensor 140), an impacted component or system (e.g., lubrication system 120), etc. Provider network 320 may, in turn, provide an alert message (e.g., an SMS message, email, etc.) to a user or client application 385.

Shutdown logic 640 may manage pump shutdown actions in accordance with configured settings. For example, shutdown logic 640 may be configured to deactivate (e.g., cut power) or turn off/shut down pump equipment 100 if level sensor 140 reports low fluid levels for a certain time period or a configured number of readings. According to another implementation, shutdown logic 640 initiate a pump shutdown upon receiving a signal from provider network 320 (e.g., application server 360).

Figure 7:
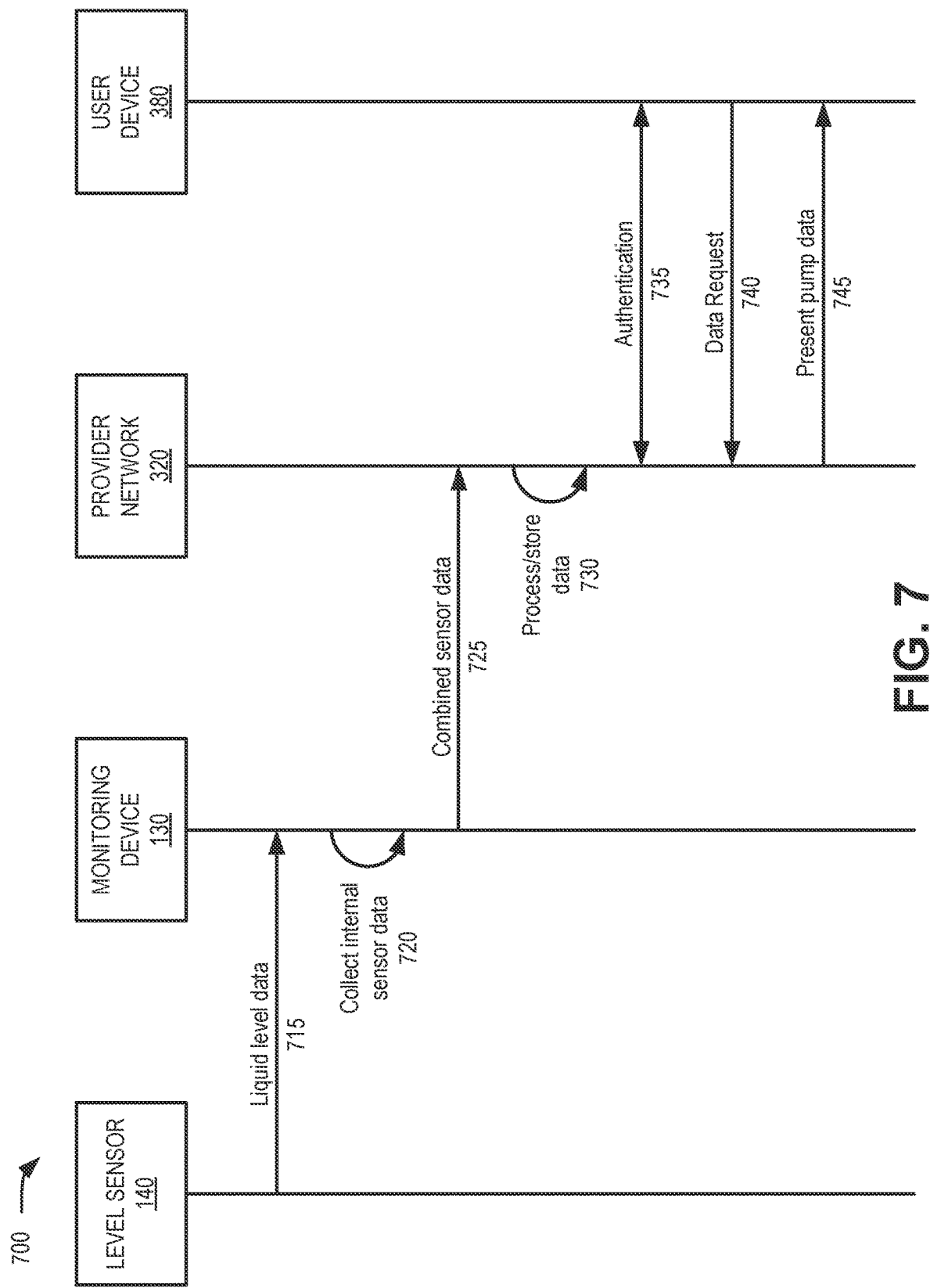
FIG. 7 is a signal flow diagram illustrating typical communications in a portion of the environment of FIG. 3, according to an implementation.

FIG. 7 is a signal flow diagram illustrating typical communications in a portion 700 of environment 300 for using monitoring device 130 with level sensor 140. More particularly, communications shown in FIG. 7 relate to periodic monitoring of reservoir 110. As shown in FIG. 7, network environment portion 700 may include monitoring device 130, level sensors 140, provider network 320, and user device 380. Communications shown in FIG. 7 provide simplified illustrations of communications in portion 700 and are not intended to reflect every signal or communication exchanged between devices.

Monitoring device 130 may collect analog and/or digital sensor data 715 from level sensor 140. For example, monitoring device 130 may receive liquid level readings from level sensor 140 connected to sensor interface 535. Monitoring device 130 may also collect internal sensor data 720 from internal sensors, such as local vibration sensor 505, temperature sensor 510, and location monitor 515.

Monitoring device 130 may compile sensor data 715 and 720 as combined sensor data 725 and send combined sensor data 725 to provider network 320, thus providing a consolidated data channel for multiple sensors. Monitoring device 130 may send data at configured upload intervals using, for example, a broadband cellular connection. Provider network 320 (e.g., application server 360) may receive, process, and store 730 the combined sensor data 725 (e.g., store in database 340).

After receiving combined sensor data 725, a user of user device 380 may initiate an authentication procedure 735 with provider network 320 to access stored data for pump equipment 100. In one implementation, authentication procedure 735 may be managed via client application 385 on user device 380. In another implementation, authentication procedure 735 may be managed via a web browser interface on user device 380 to solicit user credentials.

Assuming the user is authenticated, user device 380 may submit a data request 740 to provider network 320 to access data from monitoring device 130. In response, provider network 320 may retrieve corresponding data stored in database 340, and provide the pump data (e.g., including data from level sensor 140) to user device 380 via, for example, web server 330 and/or application server 360. Maintenance personnel at user device 380 may then remotely determine whether any issues exist with respect to operations of pump equipment 100

Figure 8:
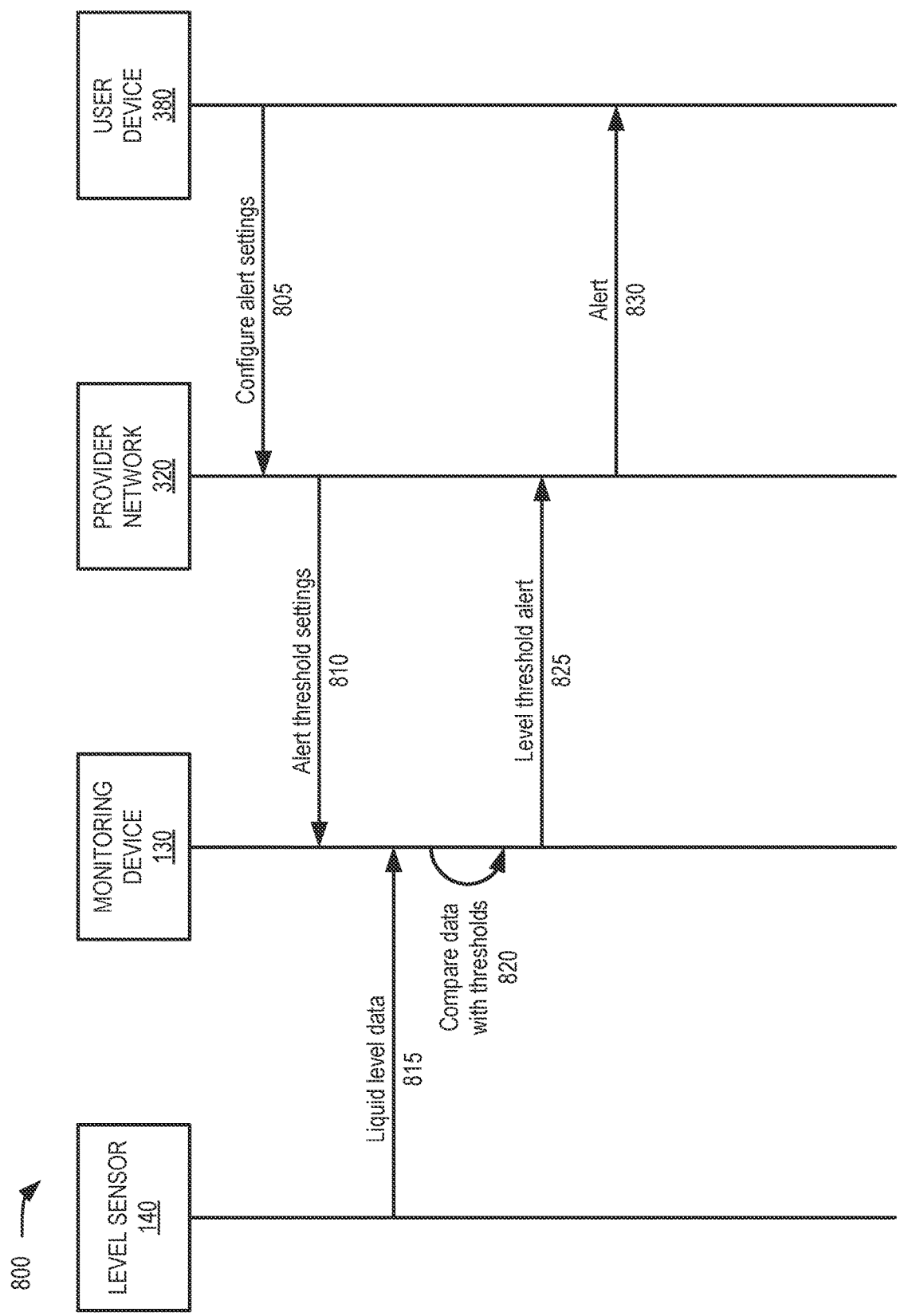
FIG. 8 is a signal flow diagram illustrating alert communications in a portion of the environment of FIG. 3, according to another implementation.

FIG. 8 is a signal flow diagram illustrating alert-related communications in network portion 800 for using monitoring device 130 with level sensor 140. More particularly, communications shown in FIG. 8 relate to providing alerts for low levels in reservoir 110. Communications shown in FIG. 8 provides simplified illustrations of communications in portion 800 and are not intended to reflect every signal or communication exchanged between devices.

Referring to FIG. 8, an authenticated user may use client application 385 on user device 380 to configure alert setting 805 for monitoring device(s) 130 on pump equipment 100. Alert settings may include, for example, (a) threshold values related to reservoir 110 for each monitoring device 130 and/or (b) contact information for automated alerts (e.g., e-mail address, phone numbers, account names, etc.). Provider network 320 (e.g., application server 360) may forward some of the alert settings 810, such as the configuration thresholds (if applicable) to monitoring device 130. Monitoring device 130 may store the alert settings 810 (e.g., in memory 525). If level sensor 140 is connected to monitoring device 130, monitoring device 130 may collect analog and/or digital liquid level data 815 from level sensor 140.

Monitoring device 130 may compare 820 level sensor data 815 with the stored alert thresholds 810. If monitoring device 130 identifies that a threshold had been met/exceeded for reservoir 110, monitoring device 130 may send a level threshold alert 825 to provider network 320. For example, monitoring device 130 may use a cellular or wired connection to provide level threshold alert 825 to application server 360. In one implementation, monitoring device 130 may provide level threshold alert 825 immediately to application server 360 (e.g., without waiting for a configured periodic data upload interval). The level threshold alert 825 may include the data from level sensor 140 that triggered level threshold alert 825. In another implementation, level threshold alert 825 may include a full data upload of any unreported sensor data (e.g., vibration, temperature, location data).

Upon receiving level threshold alert 825, provider network 320 (e.g., application server 360) may generate and send an alert message 830 in accordance with the configured alert settings 805. For example, application server 360 may generate and send an SMS message to one or more contacts associated with an account for monitoring device 130.

Although FIGS. 7 and 8 show exemplary communications for monitoring and alerts using monitoring device 130, in other implementations, fewer, different, or additional communications may be used. For example, in other implementation, monitoring device 130 may report data from multiple level sensors 140, such as level sensors 140 connected to different pump equipment 100. In addition, in some implementations, monitoring device 130 and/or user device 380 may send a signal to automatically shut down pump equipment 100 when a level threshold alert is detected.

A device, system, and methods are provided for remotely monitoring liquid lubricant levels for pump equipment. A system includes a reservoir to store lubricant and a lubrication gland to expose a shaft seal of the pump equipment to the lubricant. A feed line and a return line circulate the lubricant between the reservoir and the lubrication gland. A level sensor is configured to measure a fluid level in the reservoir. The level sensor uses a communication interface to transmit fluid level data a monitoring device mounted to the pump equipment. The monitoring device is configured to compare the fluid level data against stored alert thresholds and send, to a provider network, an alert signal when the fluid level data is below an alert threshold. If the fluid level data is not below an alert threshold, the monitoring device may store the fluid level data for periodic reporting.

According to another implementation, a method includes providing pump equipment that includes a lubrication system and a monitoring device. The lubrication system may include: a reservoir configured to store liquid lubricant, a lubrication gland configured to expose a shaft seal of the pump equipment to the liquid lubricant, a feed line configured to provide liquid lubricant from the reservoir to the lubrication gland, a return line to provide liquid lubricant from the lubrication gland to the reservoir, a liquid level sensor configured to measure a fluid level in the reservoir, and a communication interface to transmit fluid level data from the liquid level sensor to the monitoring device. The method further includes configuring the monitoring device to: store alert thresholds for the fluid level data; receive, from the liquid level sensor, fluid level data; compare the fluid level data against the stored alert thresholds; send, to a provider network, a level alert when the fluid level data is below one of the stored alert thresholds; and store the fluid level data when the fluid level data is not below one of the stored alert thresholds.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. Also, while a series of messages have been described with regard to FIGS. 7 and 8, the order of the message/operation flows may be modified in other embodiments. Further, non-dependent messages may be performed in parallel. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such.

What is claimed is:

1. A system for pump equipment, the system comprising:
   a reservoir configured to store liquid lubricant;
   a lubrication gland configured to expose a shaft seal of the pump equipment to the liquid lubricant;
   a feed line configured to provide liquid lubricant from the reservoir to the lubrication gland;
   a return line to provide liquid lubricant from the lubrication gland to the reservoir;
   a liquid level sensor configured to measure a fluid level in the reservoir;
   a monitoring device mounted to the pump equipment; and
   a communication interface to transmit fluid level data from the liquid level sensor to the monitoring device, wherein the monitoring device is configured to:
      compare the fluid level data against stored alert thresholds,
      send, to a provider network, a level alert when the fluid level data is below one of the stored alert thresholds,
      store the fluid level data when the fluid level data is not below one of the stored alert thresholds,
      obtain, at a first periodic interval, data samples from one or more sensors internal to a housing of the monitoring device,
      store the data samples with the stored fluid level data to form combined data,
      establish, at a second periodic interval and via a wireless communications interface, a connection with the provider network, and
      send, via the wireless communications interface, the combined data to the provider network.

2. The system of claim 1, wherein the reservoir is mounted to the pump equipment.

3. The system of claim 1, wherein the liquid level sensor is mounted to the reservoir.

4. The system of claim 1, wherein, when sending the level alert, the monitoring device is further configured to:
   send the level alert via a broadband cellular connection.

5. The system of claim 1, wherein the system continuously circulates the liquid lubricant between the reservoir and the lubrication gland through the feed line and the return line during operation of the pump equipment.

6. The system of claim 1, wherein the liquid lubricant in the lubrication gland lubricates the shaft seal when the pump equipment is being run without pumped fluids.

7. The system of claim 1, wherein the communication interface includes a wired interface.

8. The system of claim 1, wherein the monitoring device includes one or more covered access ports for the communication interface to the liquid level sensor.

9. The system of claim 1, wherein the liquid level sensor includes a capacitive liquid level sensor.

10. The system of claim 1, wherein the liquid lubricant includes propylene glycol.

11. The system of claim 1, wherein the provider network further comprises:
   a network device configured to:
      receive, from the monitoring device, the fluid level data for the pump equipment,
      store the fluid level data,
      authenticate a user of a user device to retrieve the fluid level data, and
      send, to the user device, the fluid level data after the authentication.

12. The system of claim 11, wherein the network device is further configured to:
   receive, from the user device, data management settings including values for the stored alert thresholds, and
   send, to the monitoring device, the values.

13. The system of claim 1, further comprising:
   a user device configured to:
      receive, via a user interface, user input to define data management settings including values for the stored alert thresholds and periodic reporting intervals,
      send, to the provider network, the user input, and
      retrieve, from the provider network, the fluid level data for the pump equipment based on the data management settings.

14. The system of claim 1, wherein the monitoring device is further configured to:
  initiate shutdown of the pump equipment when the fluid level data is below one of the stored alert thresholds for a configured period.

15. The system of claim 1, wherein the monitoring device includes an internal power supply.

16. A method comprising:
  providing pump equipment that includes a lubrication system and a monitoring device, wherein the lubrication system includes:
    a reservoir configured to store liquid lubricant,
    a lubrication gland configured to expose a shaft seal of the pump equipment to the liquid lubricant,
    a feed line configured to provide liquid lubricant from the reservoir to the lubrication gland,
    a return line to provide liquid lubricant from the lubrication gland to the reservoir,
    a liquid level sensor configured to measure a fluid level in the reservoir, and
    a communication interface to transmit fluid level data from the liquid level sensor to the monitoring device; and
  configuring the monitoring device to:
    store alert thresholds for the fluid level data,
    receive, from the liquid level sensor, fluid level data,
    compare the fluid level data against the stored alert thresholds,
    send, to a provider network, a level alert when the fluid level data is below one of the stored alert thresholds,
    store the fluid level data when the fluid level data is not below one of the stored alert thresholds,
    obtain, at a first periodic interval, data samples from one or more sensors internal to a housing of the monitoring device,
    store the data samples with the stored fluid level data to form combined data,
    establish, at a second periodic interval and via a wireless communications interface, a connection with the provider network, and
    send, via the wireless communications interface, the combined data to the provider network.

17. The method of claim 16, wherein configuring the monitoring device to send the combined data further comprises configuring the monitoring device to:
  send the combined data via a wireless personal area network (WPAN).

18. The method of claim 16, wherein the lubrication system continuously circulates the liquid lubricant between the reservoir and the lubrication gland through the feed line and the return line during operation of the pump equipment.

19. The method of claim 16, wherein configuring the monitoring device further comprises configuring the monitoring device to:
  initiate shutdown of the pump equipment when the fluid level data is below one of the stored alert thresholds for a configured period.

20. The method of claim 16, wherein configuring the monitoring device to send the combined data further comprises configuring the monitoring device to:
  send the combined data via a broadband cellular connection.

* * * * *